US011890787B2

(12) United States Patent
Kubo et al.

(10) Patent No.: US 11,890,787 B2
(45) Date of Patent: Feb. 6, 2024

(54) DELIVERY DEVICE, MOLD USING SAME, AND DELIVERY METHOD

(71) Applicant: HONDA MOTOR CO., LTD., Tokyo (JP)

(72) Inventors: Yukihiro Kubo, Tochigi (JP); Toshikazu Kato, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 125 days.

(21) Appl. No.: 17/278,868

(22) PCT Filed: Sep. 19, 2019

(86) PCT No.: PCT/JP2019/036701
§ 371 (c)(1),
(2) Date: Mar. 23, 2021

(87) PCT Pub. No.: WO2020/066822
PCT Pub. Date: Apr. 2, 2020

(65) Prior Publication Data
US 2022/0048223 A1    Feb. 17, 2022

(30) Foreign Application Priority Data

Sep. 25, 2018    (JP) .................................. 2018-179517

(51) Int. Cl.
*B05B 7/04*      (2006.01)
*B29C 33/58*     (2006.01)
*B05D 1/02*      (2006.01)

(52) U.S. Cl.
CPC ............ *B29C 33/58* (2013.01); *B05B 7/0433* (2013.01); *B05D 1/02* (2013.01)

(58) Field of Classification Search
None
See application file for complete search history.

(56) References Cited

U.S. PATENT DOCUMENTS 4,099,673 A * 7/1978 Heath ..................... F16K 3/26
                                                    239/431
4,452,917 A * 6/1984 Proksa .................. B29B 7/7605
                                                    261/DIG. 26

FOREIGN PATENT DOCUMENTS

JP    S58-08152 B2    4/1983
JP    1-73356 U       5/1989
(Continued)

OTHER PUBLICATIONS

Chinese Office Action dated Dec. 3, 2021, 7 pages.
International Search Report, PCT/JP2019/036701 dated Oct. 29, 2019, 2 pages.

*Primary Examiner* — Alexander M Weddle
(74) *Attorney, Agent, or Firm* — Rankin, Hill & Clark LLP

(57) ABSTRACT

A delivery device includes a first fluid supply path to supply first fluid, a second fluid supply path to supply second fluid to be mixed with the first fluid for obtaining a mixture, a mixing chamber to which first and second fluid supply paths are connected and in which the first and second fluids are mixed, and a delivery port for delivering the mixture from the mixing chamber, in which the first fluid supply path is connected to a downstream side end part in the flow direction of the mixing chamber, the second fluid supply path is connected to the upstream side end part in the flow direction of the mixing chamber, and the delivery port is provided on a side wall of the mixing chamber between the downstream side end part and the upstream side end part.

6 Claims, 12 Drawing Sheets

(56) References Cited

FOREIGN PATENT DOCUMENTS

| | | | |
|---|---|---|---|
| JP | 6-210425 | A | 8/1994 |
| JP | 2001-259816 | A | 9/2001 |
| JP | 2002-66389 | A | 3/2002 |
| JP | 2007-75792 | A | 3/2007 |
| JP | 2009-131767 | A | 6/2009 |
| JP | 4589667 | B2 | 12/2010 |
| JP | 2014-057924 | A | 4/2014 |
| JP | 2014057924 | A * | 4/2014 |

* cited by examiner

DELIVERY DEVICE, MOLD USING SAME, AND DELIVERY METHOD

TECHNICAL FIELD

The present invention relates to a delivery device capable of spraying two kinds of fluids, for example, a mixed fluid substance in which a liquid such as a release agent and air is mixed, and gas such as air from the same delivery port by switching between the two kinds of fluids, a mold using the same, and a delivery method.

BACKGROUND ART

Conventionally, in order to apply a liquid uniformly and thinly, a delivery device by which a liquid is mixed with air, atomized, and sprayed has been generally used (for example, Japanese Patent Laid-Open No. 58-18152). In addition, a delivery device that is configured to be able to spray only air to remove a foreign substance attached to a liquid application surface or to dry the application surface has also been generally used.

In addition, a fluid blow gun or the like that can easily switch between delivery of a mixed fluid substance and delivery of only air by an operation at hand has been proposed. (For example, Japanese Patent No. 4589667)

CITATION LIST

Patent Literature

Patent Literature 1: Japanese Patent Laid-Open No. 58-18152
Patent Literature 2: Japanese Patent No. 4589667

SUMMARY OF INVENTION

Technical Problem

However, in the conventional delivery device, there has been a problem in that a liquid remaining in a pipe drips from a delivery port due to gravity or the like after the delivery is stopped, or that the mixed fluid substance remaining in the pipe is delivered by being drawn by an air flow to be delivered when switching from a mixture delivery state to an air delivery state and it takes time to completely shift to a delivery state of only air.

In view of the above points, an object of the present invention is to provide a delivery device, a mold using the same, and a delivery method that can suppress or prevent the delivery of the remaining mixed substance when switching from the mixture delivery state to the air delivery state, and do not cause dripping after the delivery is stopped.

Solution to Problem

[1] In order to achieve the above object, the present invention is a delivery device including
a first fluid supply path that supplies a first fluid,
a second fluid supply path that supplies a second fluid to be mixed with the first fluid for obtaining a mixture,
a mixing chamber to which the first fluid supply path and the second fluid supply path are connected, and in which the first fluid and the second fluid are mixed with each other, and
a delivery port capable of delivering the mixture from the mixing chamber, wherein
the first fluid supply path is connected to a downstream side end part in a flow direction of the mixing chamber,
the second fluid supply path is connected to an upstream side end part in the flow direction of the mixing chamber,
the first fluid and the second fluid are mixed in the mixing chamber such that the flow directions of the first fluid and the second fluid are opposed to each other, and
the delivery port is provided on a side wall between the downstream side end part in the flow direction and the upstream side end part in the flow direction.

According to the present invention, the first fluid supply path is connected to a connection part at the downstream side end part in the flow direction of the mixing chamber, and the second fluid supply path is connected to a connection part at the upstream side end part in the flow direction of the mixing chamber. The first fluid and the second fluid are mixed in the mixing chamber such that the flow directions of the first fluid and the second fluid are opposite to each other. Since the delivery port is provided on the side wall of the mixing chamber between the downstream side end part in the flow direction and the upstream side end part in the flow direction, only the first fluid is supplied from the first fluid supply path to the mixing chamber when switching from a mixture delivery state in which the mixture is delivered from the delivery port to a first fluid delivery state in which only the first fluid is delivered from the delivery port. Thereby, the back pressure of the second fluid supply path can be increased, and the delivery of the second fluid remaining in the second fluid supply path and the mixing chamber can be suppressed or prevented at an early stage. As a result, switching from the mixture delivery state to the first fluid delivery state can be performed smoothly.

[2] In addition, in the present invention, the delivery device can be configured to include
an outer cylinder,
an inner cylinder arranged in the outer cylinder, and
a communication part that communicates the first fluid supply path formed in an inner space of the inner cylinder and a space between the outer cylinder and the inner cylinder at the downstream side end part in the flow direction of the inner cylinder and the outer cylinder, wherein
the mixing chamber is defined between the outer cylinder and the inner cylinder,
the side wall is formed of the outer cylinder, and
the delivery port is provided on the outer cylinder.

According to the present configuration, since the delivery device can be formed with a relatively simple configuration, process cost of parts can be suppressed, and replacement and the like of parts such as the outer cylinder and the inner cylinder can be performed relatively easily.

[3] In addition, in the present invention, preferably,
the first fluid is air, and
the second fluid is a liquid, and
the delivery device includes
a discharge path provided by being branched from the second fluid supply path, and
a discharge valve interposed in the discharge path so as to be freely opened and closed.

According to the configuration, in a state in which the back pressure of the second fluid supply path is increased, the second fluid remaining in the second fluid supply path can be discharged from the discharge path by opening the discharge valve. Therefore, after the end of the delivery or after switching to the delivery of only the first fluid, it is possible to promptly suppress the second fluid from dripping from the delivery port or mixing into the first fluid.

[4] In addition, a mold according to the present invention includes
- a delivery nozzle having the mixing chamber, a housing part capable of housing the delivery nozzle, a pressing mechanism that presses the delivery nozzle such that the delivery nozzle can be freely protruded from the housing part into a cavity of the mold, and a control part that controls opening and closing of the discharge valve and controls the pressing mechanism, wherein
- the first fluid supply path is provided with a first opening and closing valve interposed so as to be freely opened and closed,
- the second fluid supply path is provided with a second opening and closing valve interposed so as to be freely opened and closed, and
- the control part also controls the first opening and closing valve and the second opening and closing valve, wherein
- the control part performs
- a mixture delivery process of delivering the mixture from the delivery port by opening the first opening and closing valve, opening the second opening and closing valve, and closing the discharge valve in a protruding state in which the delivery nozzle is protruded into the cavity of the mold by the pressing mechanism,
- a first fluid delivery process of delivering the first fluid from the delivery port by opening the first opening and closing valve, closing the second opening and closing valve, and opening the discharge valve in the protruding state, and
- a discharge process of discharging the second fluid remaining in the second fluid supply path from the discharge path by maintaining an opening state of the first opening and closing valve, a closing state of the second and opening valve, and an opening state of the discharge valve for a predetermined time after the first fluid delivery process has ended in a housing state in which the delivery nozzle is housed in the housing part of the mold by the pressing mechanism.

With the mold of the present invention, when the mixture delivery process in which the mixture is delivered from the delivery port is switched to the first fluid delivery process in which the first fluid is delivered from the delivery port, the back pressure of the second fluid supply path can be increased by supplying only the first fluid from the first fluid supply path to the mixing chamber, and the delivery of the second fluid remaining in the second fluid supply path together with the first fluid can be suppressed or prevented by discharging the second fluid from the mixing chamber. As a result, switching from the mixture delivery process to the first fluid delivery process can be performed smoothly.

In addition, in the discharge process, the second fluid remaining in the second fluid supply path can be discharged from the discharge path by increasing the back pressure of the second fluid supply path and opening the discharge valve.

[5] In addition, it is preferable that the present invention includes
- a plurality of delivery nozzles each having the mixing chamber and the delivery port, and
- a branch part interposed in the second fluid supply path that branches from the one second fluid supply path into the plurality of second fluid supply paths from an upstream side to a downstream side to be respectively connected to the delivery nozzles, wherein the branch part is configured such that a connection part to which the second fluid supply path branching into the plurality of paths on the downstream side is connected is located above a connection part of the one second fluid supply path located on the upstream side.

When the branch part is interposed, if the second fluid supply paths on the downstream side whose plurality of paths are connected to the branch part are arranged below, it is difficult for the second fluid downstream of the branch part of the second fluid supply path to be pushed back by the second fluid remaining in the branch part even if the back pressure of the second fluid supply path is increased during the first fluid delivery process.

As described above, by arranging the plurality of second fluid supply paths on the downstream side, which are connected to the branch part, above the branch part, flowing of the second fluid remaining in the branch part into the second fluid supply path downstream of the branch part can be prevented. As a result, it is possible to suppress or prevent the second fluid remaining in the second fluid path from being delivered during the first fluid delivery process in a more reliable manner.

[6] In addition, in the mold of the present invention, the first fluid can be air and the second fluid can be a release agent.

[7] In addition, in the mold of the present invention, a discharge path that discharges the second fluid therein can be connected via a discharge valve to the one second fluid supply path located on the upstream side of the branch part.

[8] In addition, the method of controlling a delivery device of the mold of the present invention includes
- a delivery nozzle having a mixing chamber therein,
- a nozzle housing part capable of housing the delivery nozzle inside the mold,
- a pressing mechanism that can freely protrude the delivery nozzle from the nozzle housing part into a cavity of the mold, and
- a control part that not only controls opening and closing of a first opening and closing valve provided in a first fluid supply path that supplies the first fluid, a second opening and closing valve provided in a second fluid supply path that supplies the second fluid, and the discharge valve but also controls the pressing mechanism,
- wherein the control part performs
- a second fluid delivery step of delivering the second fluid from the delivery port of the delivery nozzle by protruding the delivery nozzle into the cavity of the mold by the pressing mechanism, closing the discharge valve, and opening the first opening and closing valve and the second opening and closing valve,
- a first fluid delivery step of supplying only the first fluid from the first fluid supply path to the delivery nozzle by closing the second opening and closing valve and opening the discharge valve after an end of the second fluid delivery step,
- a delivery nozzle housing step of starting a housing operation on the delivery nozzle by the pressing mechanism after the first fluid delivery step,
- a discharge step of maintaining an opening state of the first opening and closing valve for a predetermined time in a housing state in which the delivery nozzle is housed in the housing part of the mold, and
- a supply end step of closing the first opening and closing valve and the discharge valve after the predetermined time has elapsed.

According to the present invention, the first fluid supply path is connected to the first connection part of the mixing chamber, and the second fluid supply path is connected to the second connection part of the mixing chamber. Then, the first fluid and the second fluid are mixed in the mixing chamber such that their flows are opposed to each other, and the delivery port is provided on the side wall of the mixing chamber between the first connection part and the second connection part. Therefore, when the mixture delivery step of delivering the mixture from the delivery port is switched to the first fluid delivery step of delivering the first fluid from the delivery port, the back pressure of the second fluid supply path can be increased by supplying the first fluid from the first fluid supply path to the mixing chamber, and discharge of the second fluid remaining in the second fluid supply path during the first fluid delivery step can be suppressed or prevented at an early stage. As a result, switching from the mixture delivery step to the first fluid delivery step can be performed smoothly.

Additionally, the control allows the first fluid to be supplied to the first fluid supply path for a predetermined time even after the delivery nozzle is housed in the nozzle housing part inside of the mold after the end of first fluid delivery process. Then, by continuously transporting the first fluid from the mixing chamber to the second fluid supply path in a state in which the delivery port is blocked by the mold, the second fluid remaining in the second fluid supply path can be discharged from the discharge path in a reliable manner. As a result, it is possible to reliably prevent liquid dripping from the delivery port after an operation is stopped.

DESCRIPTION OF EMBODIMENTS

Figure 1:
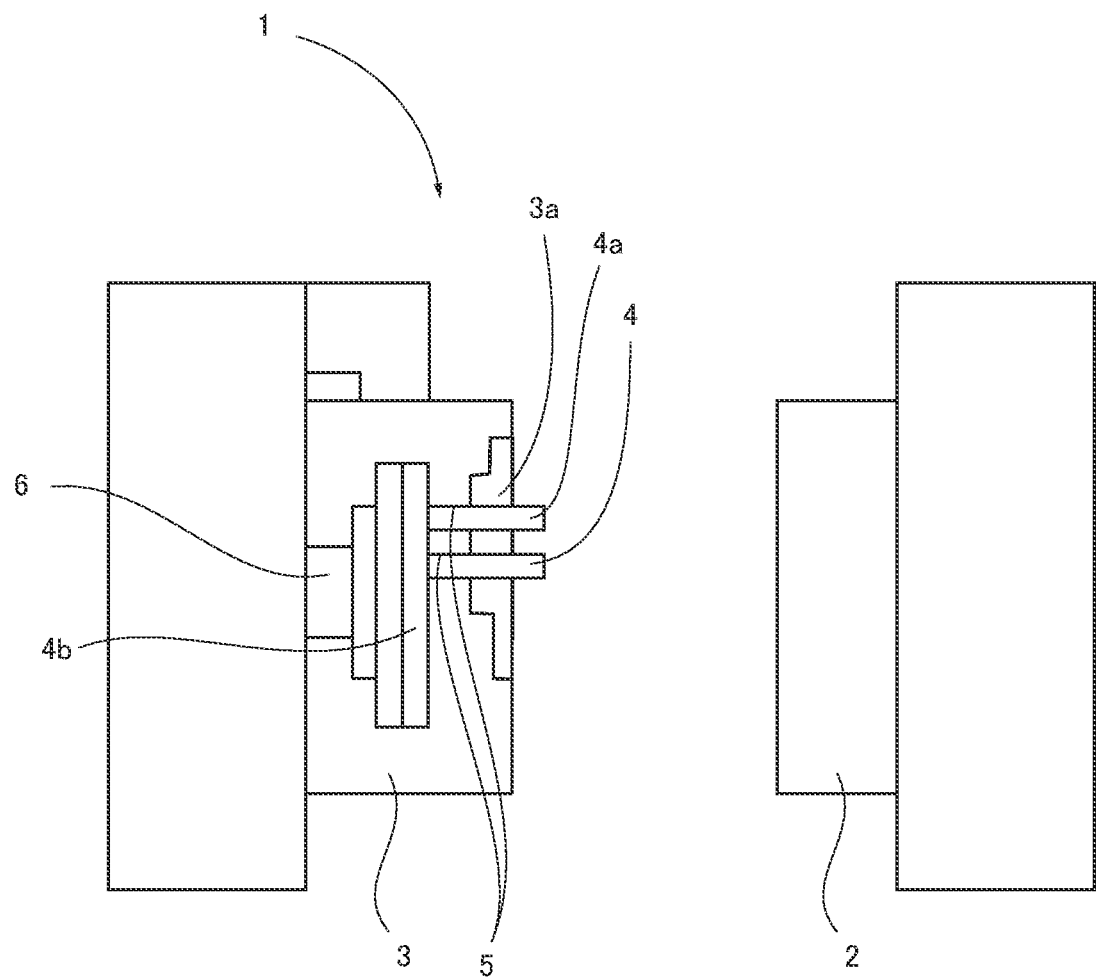
FIG. 1 is a schematic diagram showing a mold of an embodiment of the present invention.
Figure 2:
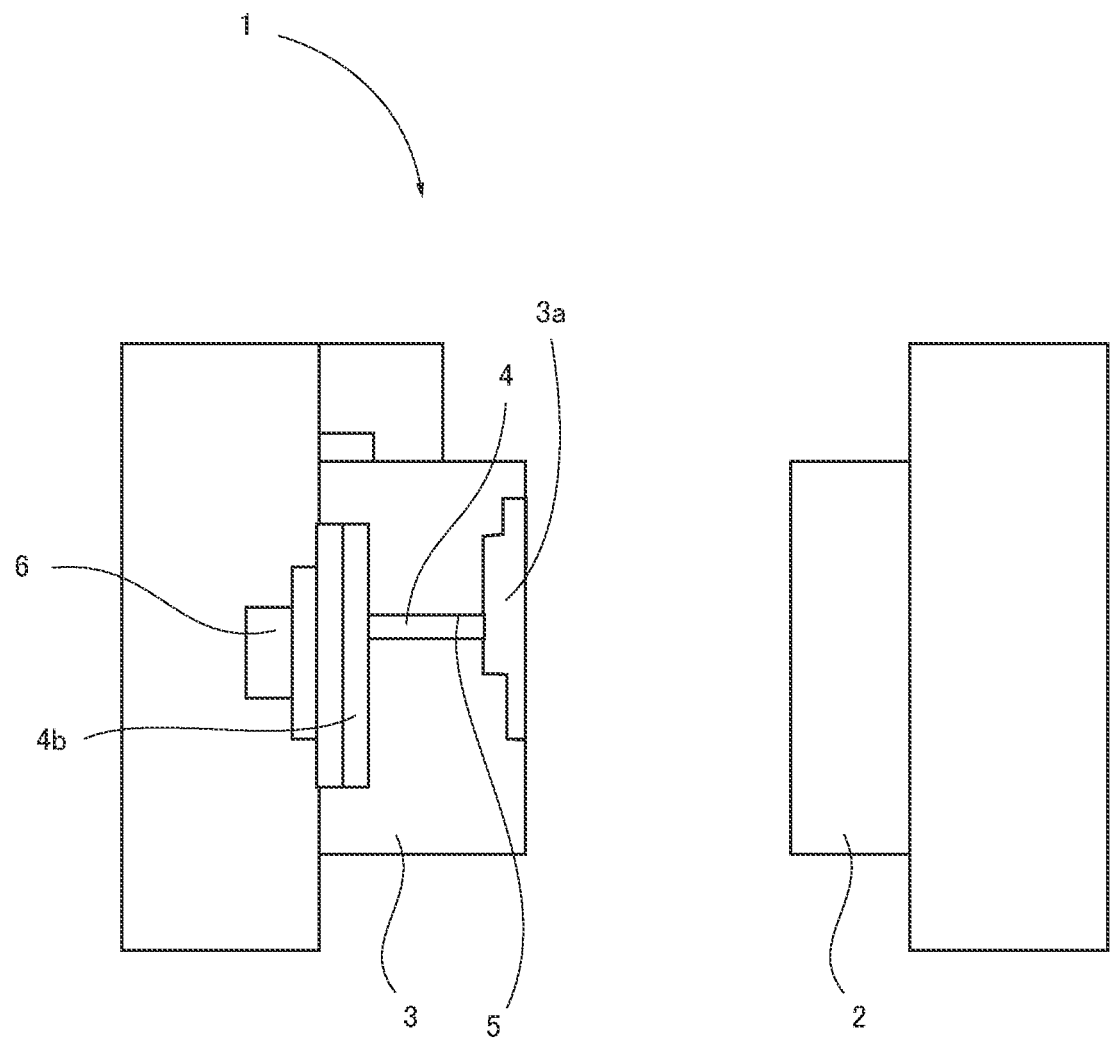
FIG. 2 is a schematic diagram showing a state in which a delivery nozzle of the mold of the present embodiment is housed.

Referring to FIG. 1, a mold 1 of according to embodiment of the present invention includes a fixed mold 2 and a movable mold 3 having a cavity 3a. The movable mold 3 is provided with an extrusion plate 4b having a plurality of extrusion pins 4a (only one is shown in the drawing) for extruding a molded product (not shown) from the movable mold 3. On the extrusion plate 4b, a plurality of delivery nozzles 4 arranged in parallel to the extrusion pins 4a are appropriately provided at locations where a release agent needs to be applied. A plurality of through holes 5 penetrating into the cavity 3a are provided on the movable mold 3, and it is possible to freely switch between a protruding state in which the extrusion pin 4a and the delivery nozzle 4 are protruded from the through hole 5 and a housing state in which the extrusion pin 4a and the delivery nozzle 4 are housed in the through hole 5 as shown in FIG. 2. In the present embodiment, the through hole 5 corresponds to the housing part of the present invention.

A pressing mechanism 6 composed of a linear motion actuator or the like is provided on the extrusion plate 4b, and the pressing mechanism 6 allows the delivery nozzle 4 to freely protrude into the cavity 3a of the movable mold 3 via the through hole 5.

Figure 3:
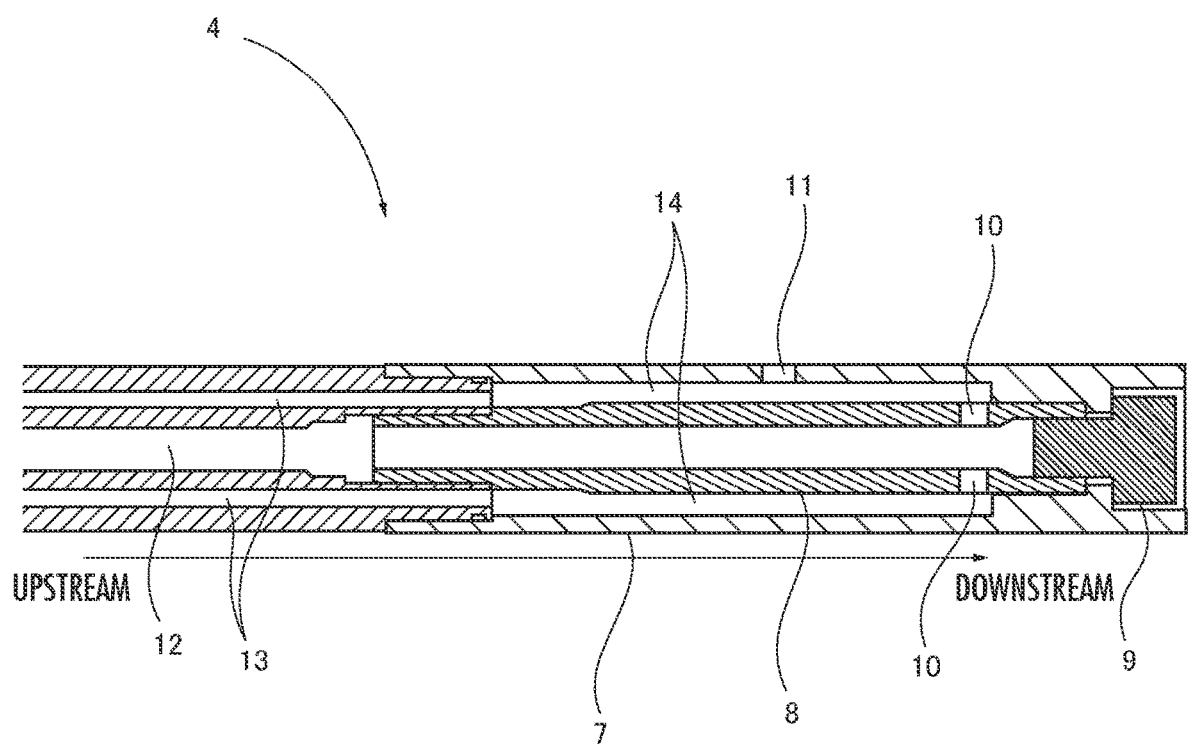
FIG. 3 is a cross-sectional view schematically showing the delivery nozzle of the present embodiment.

As shown in FIG. 3, a downstream side end part in the flow direction on the tip side of the delivery nozzle 4 includes an outer cylinder 7 and an inner cylinder 8 arranged inside of the outer cylinder 7. The tips of the outer cylinder 7 and the inner cylinder 8 are blocked by a bolt 9 such that the outer cylinder 7 and the inner cylinder 8 are positioned and fixed to each other. At the tip part of the inner cylinder 8, there are provided a plurality of communication parts 10 that open to allow an inner space of the inner cylinder 8 and a space between the outer cylinder 7 and the inner cylinder 8 to communicate with each other. Note that the number of the communication part 10 may be one. The outer cylinder 7 is provided with one delivery port 11. Note that a plurality of delivery ports 11 may be provided.

A first fluid supply path 12 that guides air as a first fluid is connected to an upstream side end part in the flow direction on a base end side of the inner cylinder 8. A plurality of second fluid supply paths 13, which are located between the outer cylinder 7 and the inner cylinder 8 to guide a liquid release agent as the second fluid, are connected to an upstream side end part in the flow direction on a base end side of the outer cylinder 7. Note that the number of the second fluid supply path 13 connected to the base end of the outer cylinder 7 may be one.

The release agent supplied to the space between the outer cylinder 7 and the inner cylinder 8 via the second fluid supply path 13 forms a mixture by being mixed with the air as the first fluid supplied to the space between the outer cylinder 7 and the inner cylinder 8 after passing through the first fluid supply path 12, the inner cylinder 8, and the communication part 10, and the mixture is sprayed from the delivery port 11. In the present embodiment, the space between the outer cylinder 7 and the inner cylinder 8 serves as a mixing chamber 14 for mixing the air as the first fluid and the release agent as the second fluid to obtain the mixture.

Figure 4:
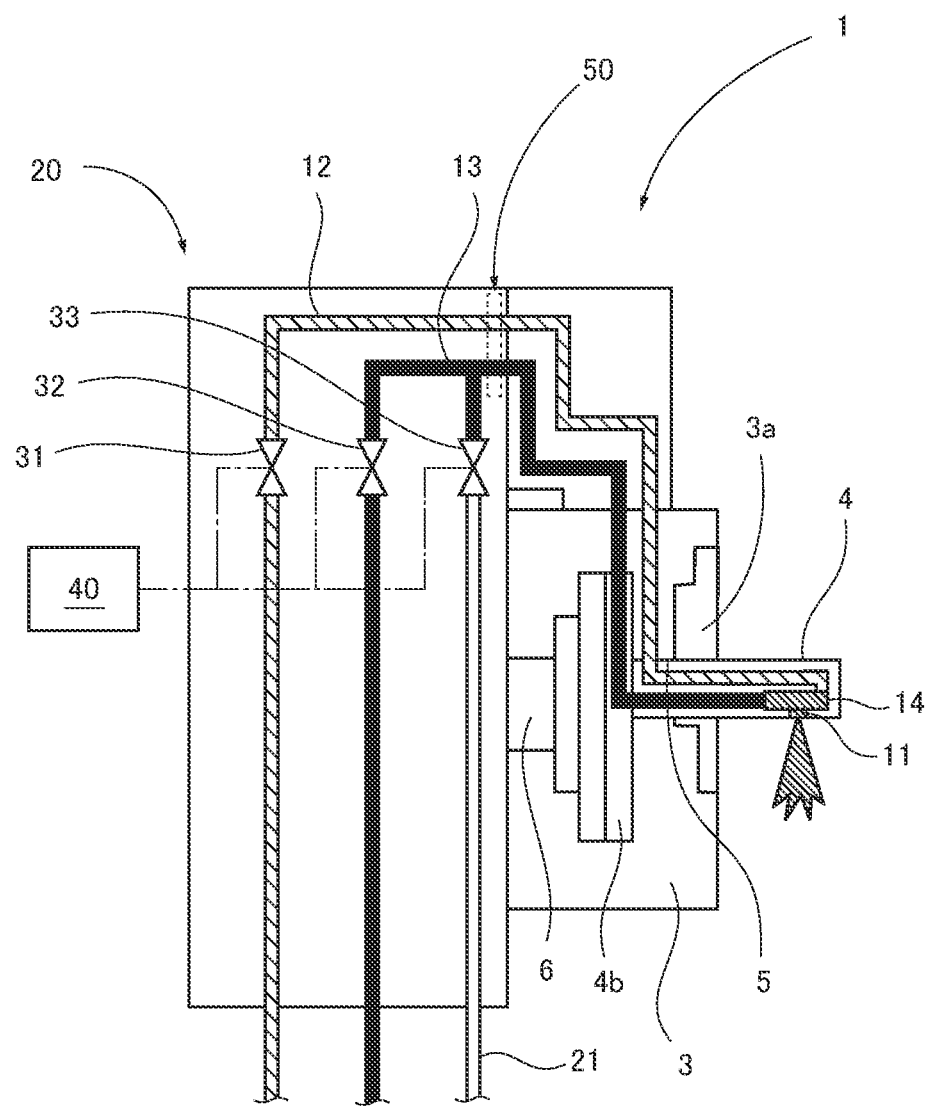
FIG. 4 is a schematic diagram showing a state of a supply path in a mixture delivery state of the present embodiment.

With reference to FIG. 4, a delivery device 20 of the present embodiment will be described. A discharge path 21 is branched and provided in the second fluid supply path 13. A first opening and closing valve 31, a second opening and closing valve 32, and a discharge valve 33, each of which is formed of a normally closed solenoid valve, are interposed in the first fluid supply path 12, the second fluid supply path 13, and the discharge path 21. Opening and closing of the first opening and closing valve 31, the second opening and closing valve 32, and the discharge valve 33 are controlled by a control part 40. The control part 40 is an electronic control unit configured with a CPU, a memory, and the like, which serves a function of switching between an opening state and a closing state of the first opening and closing valve 31, the second opening and closing valve 32, and the discharge valve 33 by executing a control program housed in a housing part such as a memory by the CPU. In addition, the control part 40 has a timer function for measuring time. Note that the delivery nozzle 4 in FIG. 4 is shown in a simplified manner.

In the second fluid supply path 13, a branch part 50 that is located downstream of a location to which the discharge path 21 is connected and that branches into a plurality of parts so as to connect the second fluid supply path 13 to each delivery nozzle 4.

Figure 5:
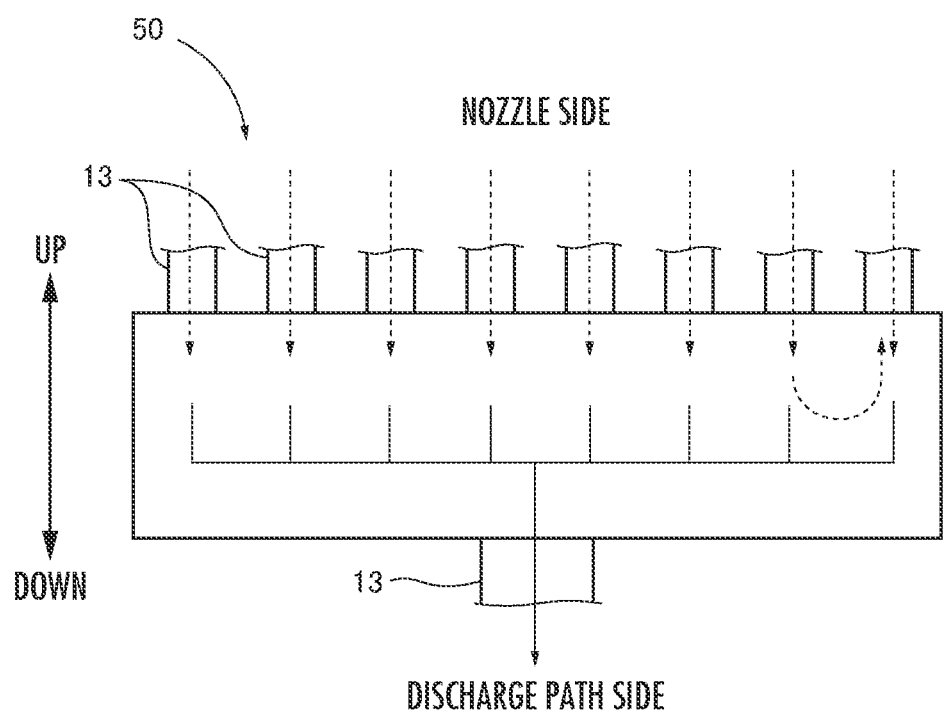
FIG. 5 is a schematic diagram showing a branch part of the present embodiment.

FIG. 5 is a schematic view showing the branch part 50 in an enlarged manner. The branch part 50 is configured such that the second fluid supply path 13 branching into a plurality of paths on the downstream side for connection to each delivery nozzle 4 (nozzle side) is located above. Thereby, when the second opening and closing valve 32 is closed and the discharge valve 33 is opened so as to discharge the release agent remaining in the second fluid supply path 13 from the discharge path 21 by the air as the first fluid, it is possible to prevent the release agent remaining in the branch part 50 from hindering the delivery of the release agent remaining in the second fluid supply path 13. Note that a pipe having flexibility is partially used between each delivery nozzle 4 and the branch part 50 so as to be able to deal with a forward and backward movement of the delivery nozzle 4.

As shown in FIG. 4, after extruding the molded product from the cavity 3a with the extrusion pin 4a, as a mixture discharge process, the control part 40 opens the first opening and closing valve 31 and the second opening and closing valve 32, and closes the discharge valve 33.

Figure 6:
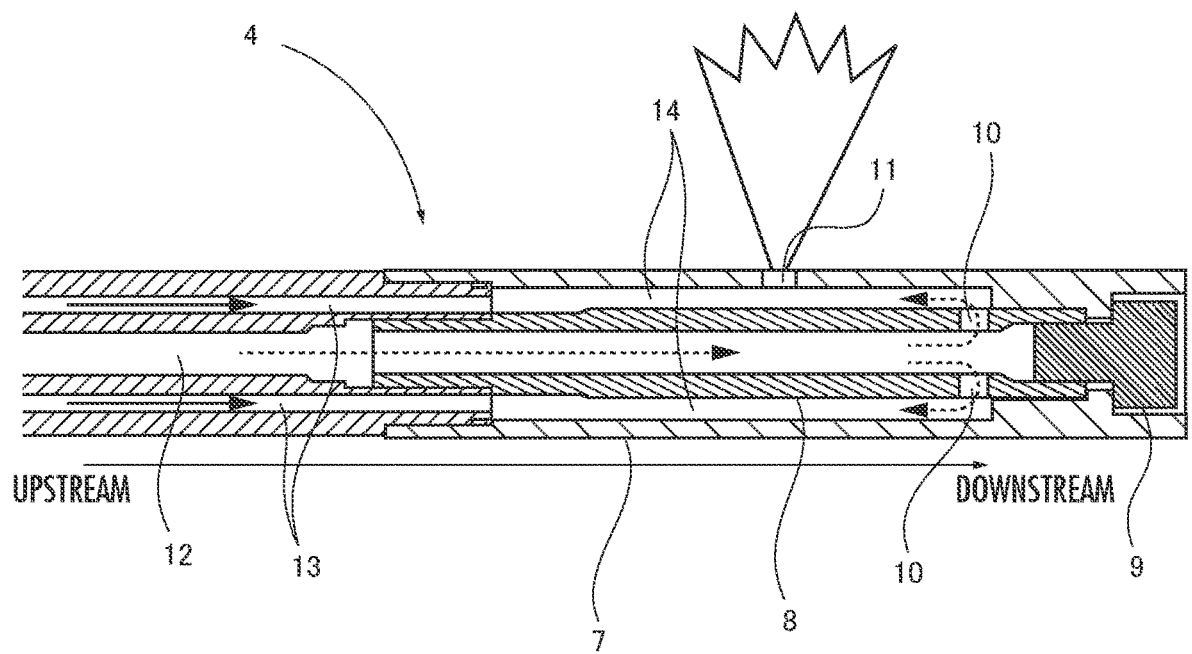
FIG. 6 is a cross-sectional view schematically showing the delivery nozzle in the mixture delivery state of the present embodiment.

At this time, as shown in FIG. 6, to the mixing chamber 14 of the delivery nozzle 4, the liquid release agent is supplied from the second fluid supply path 13 and the air as the first fluid is supplied via the first fluid supply path 12, the inner cylinder 8, and the communication part 10. The release agent and the air supplied to the mixing chamber 14 are mixed with each other and sprayed from the delivery port 11 into the cavity 3a.

Figure 7:
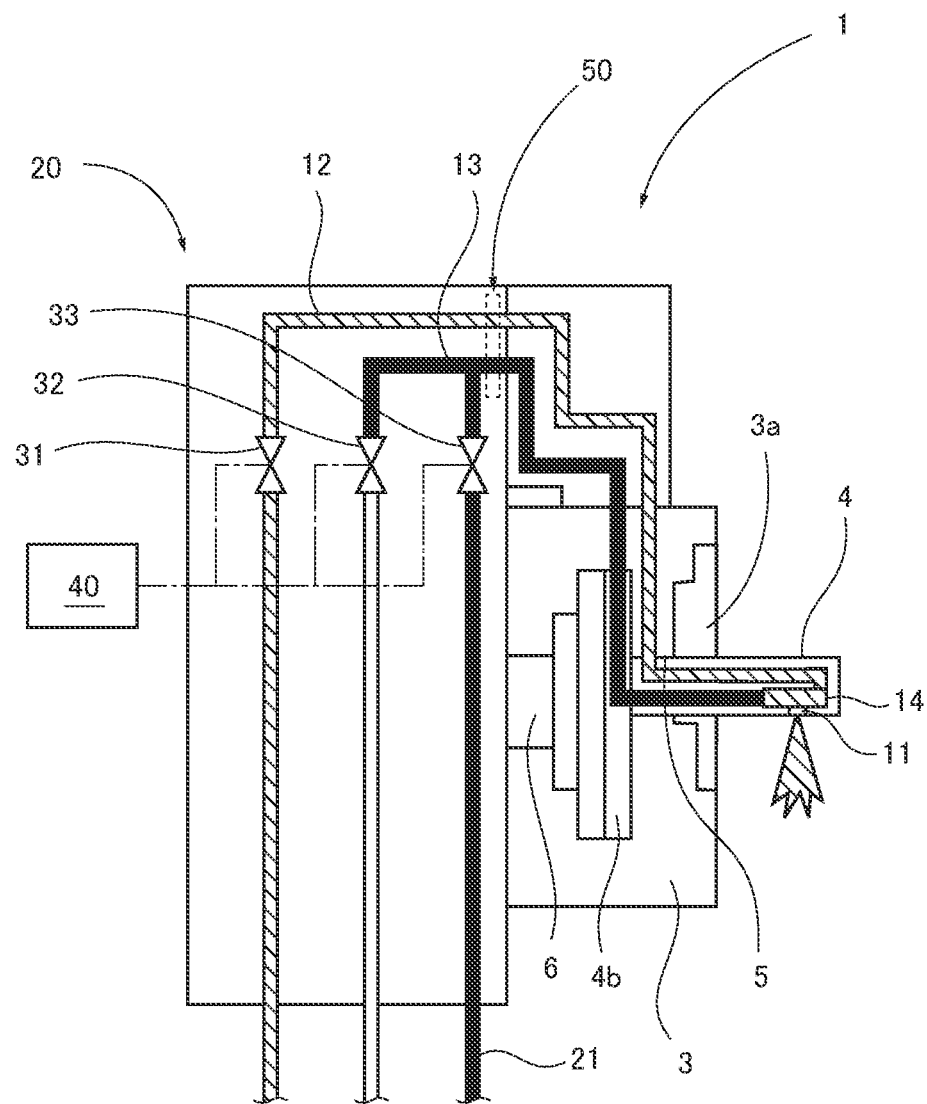
FIG. 7 is a schematic diagram showing a state of a supply path in a first fluid delivery state of the present embodiment.

As shown in FIG. 7, when the mixture delivery process ends, the control part 40 opens the first opening and closing valve 31 and the discharge valve 33, and closes the second opening and closing valve 32 as a first fluid delivery process.

Figure 8:
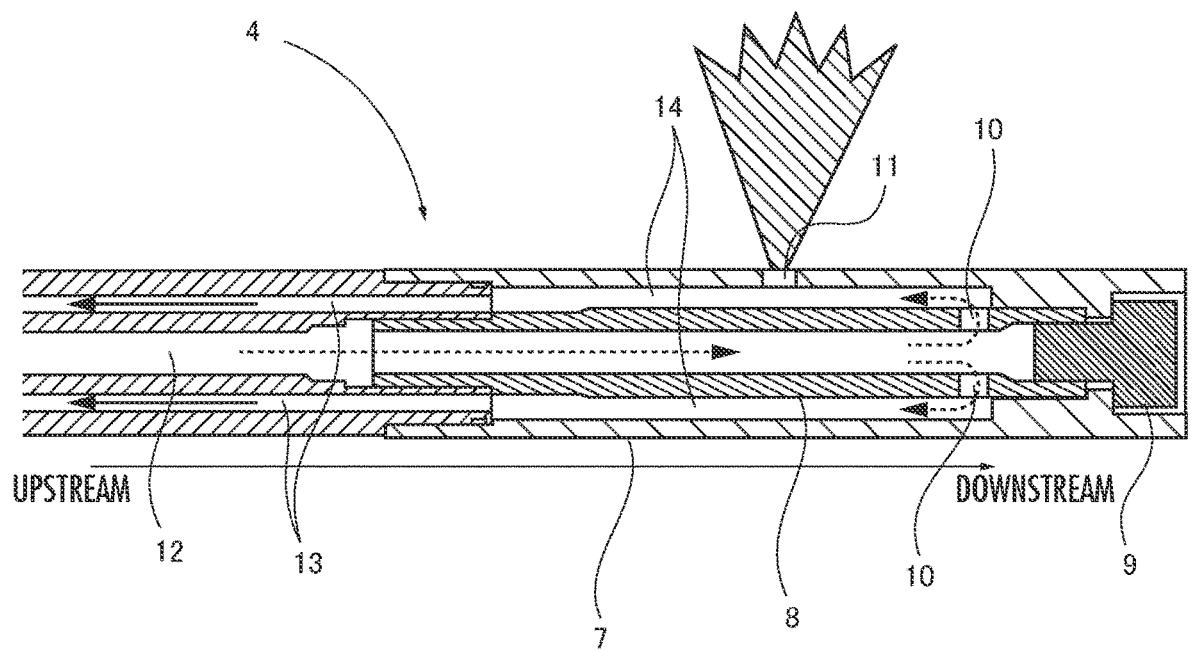
FIG. 8 is a cross-sectional view schematically showing the delivery nozzle in the first fluid delivery state of the present embodiment.

At this time, as shown in FIG. 8, the air as the first fluid is supplied to the mixing chamber 14 of the delivery nozzle 4 via the first fluid supply path 12, the inner cylinder 8, and the communication part 10, and the air is sprayed from the delivery port 11 to dry the release agent applied to the cavity 3a. Here, since only the air and no releasing agent is supplied to the mixing chamber 14, the back pressure of the second fluid supply path 13 is increased. Further, when the discharge valve 33 is opened, the release agent remaining in the second fluid supply path 13 is pushed back and discharged from the discharge path 21.

Figure 9:
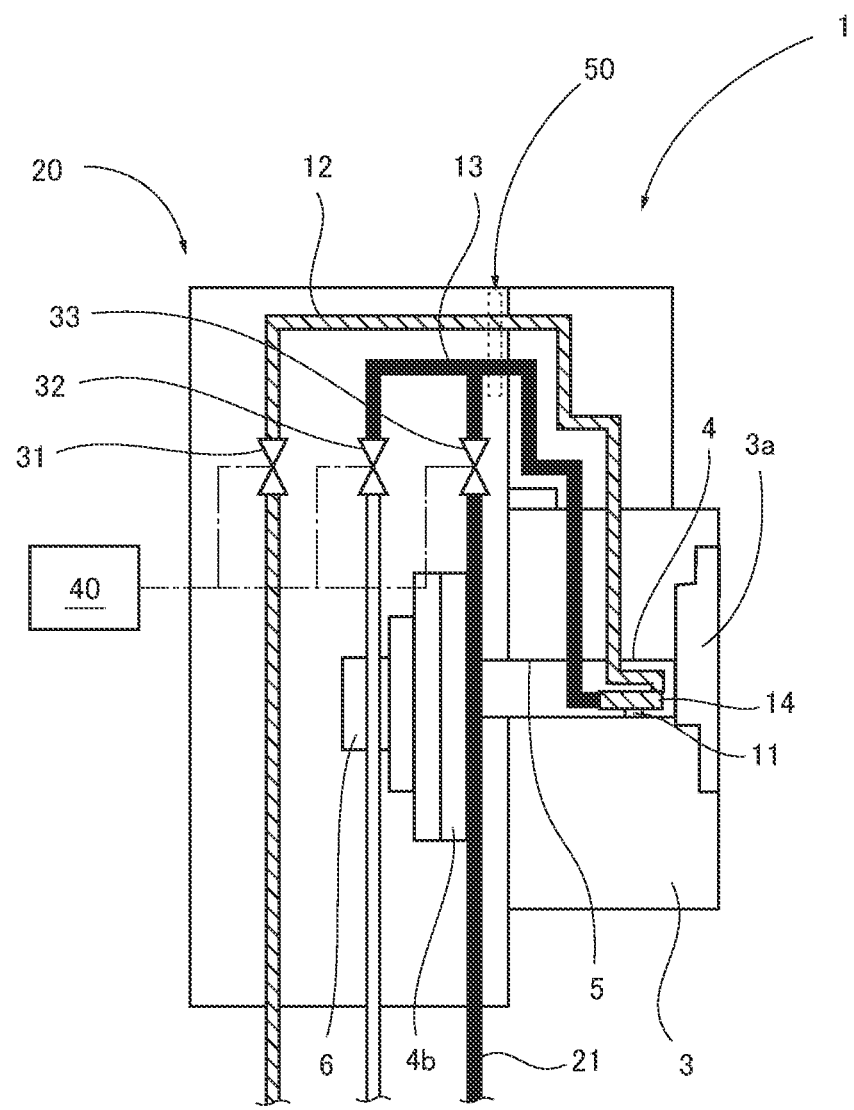
FIG. 9 is a schematic diagram showing a state of the supply path and a discharge path in a discharging state of the present embodiment.

As shown in FIG. 9, when the first fluid delivery process ends, as a discharge process, the control part 40 causes the delivery nozzle 4 to be housed in the through hole 5 as a housing part by the pressing mechanism 6 and maintains a state in which the first opening and closing valve 31 and the discharge valve 33 are opened and the second opening and closing valve 32 is closed.

Figure 10:
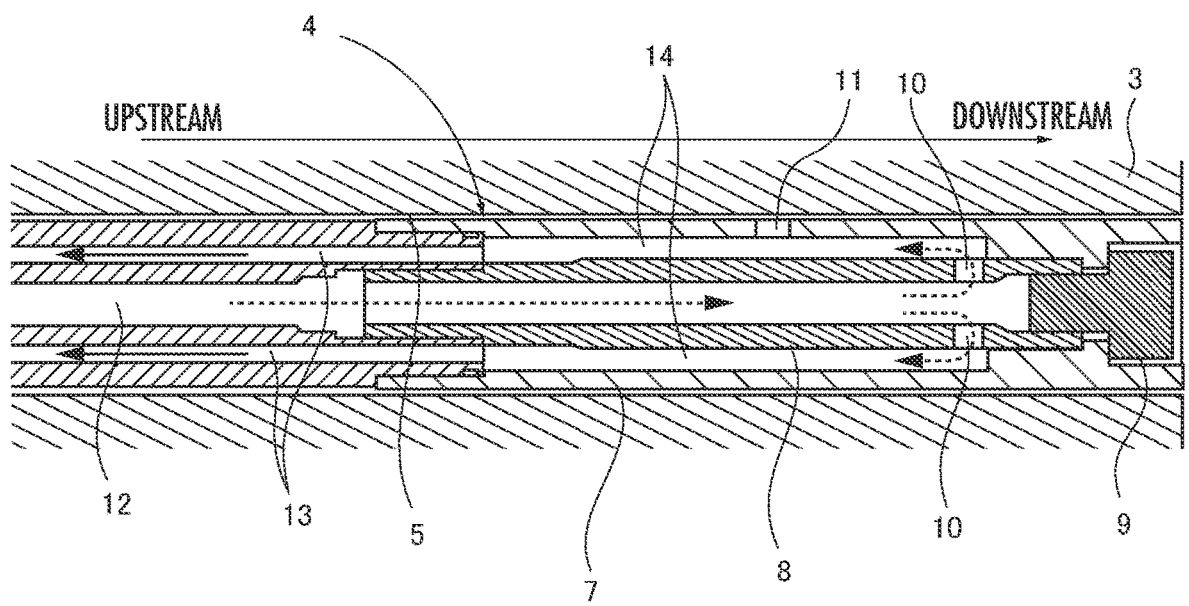
FIG. 10 is a cross-sectional view schematically showing the delivery nozzle in the discharging state of the present embodiment.

At this time, as shown in FIG. 10, when the delivery port 11 of the delivery nozzle 4 is blocked by a peripheral wall of the through hole 5 by being housed in the through hole 5, all the air supplied from the first fluid supply path 12 to the mixing chamber 14 is supplied to the second fluid supply path 13. Therefore, the release agent remaining in the second fluid supply path 13 can be quickly discharged from the discharge path 21.

Figure 11:
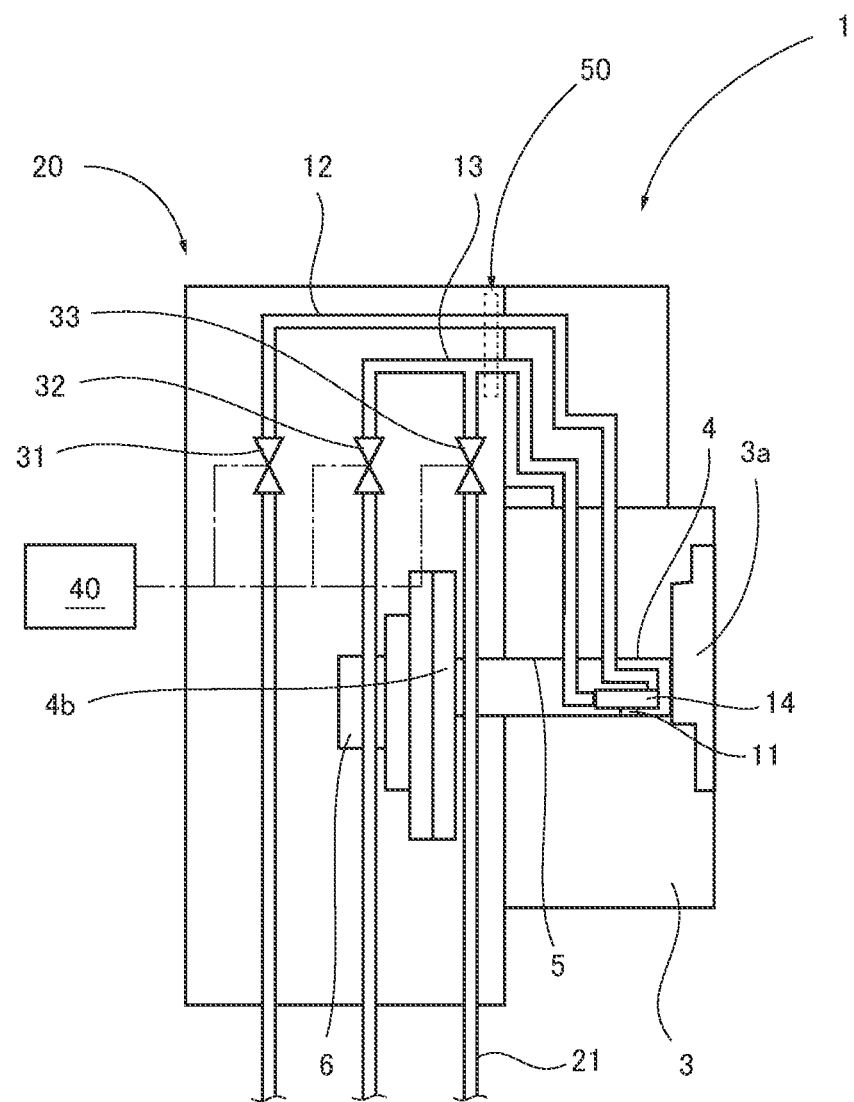
FIG. 11 is a schematic diagram showing a state of the supply path and the discharge path after the discharge of the present embodiment is completed.

As shown in FIG. 11, when the discharge process ends, the control part 40 closes all solenoid valves of the first opening and closing valve 31, the second opening and closing valve 32, and the discharge valve 33 to end the process.

Figure 12:
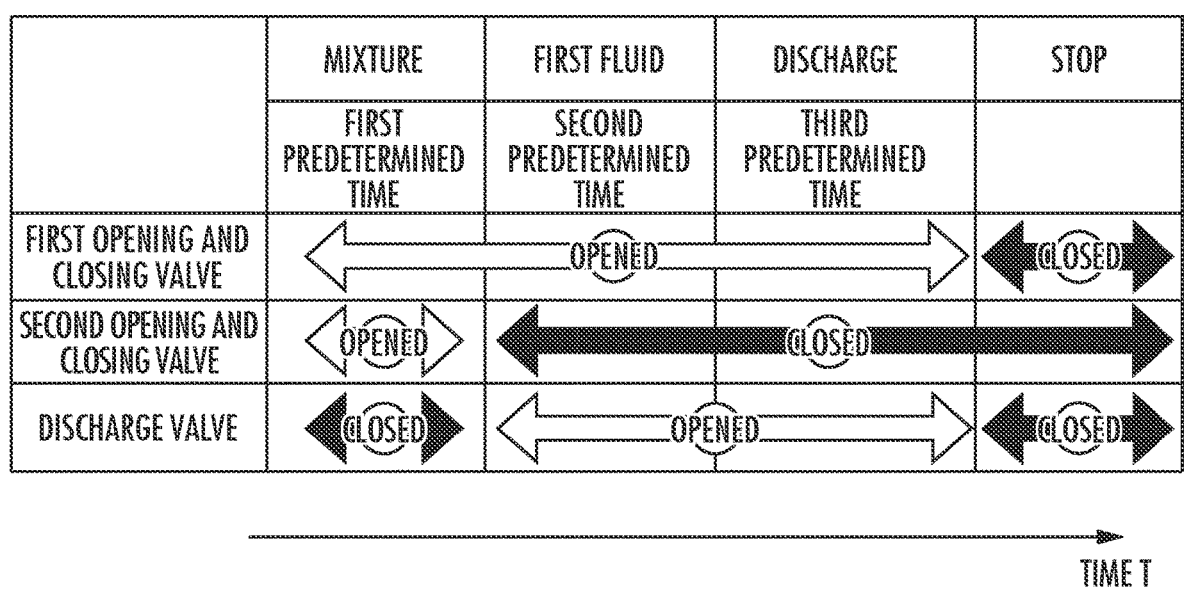
FIG. 12 is a time chart showing switching of each valve from the mixture delivery state to the completion of the discharge in the present embodiment.

FIG. 12 is a time chart showing the states of the respective solenoid valves 31 to 33 in the mixture delivery process (the second fluid delivery step), the first fluid delivery process (the first fluid delivery step), the discharge process (the discharge step), and the stop process (the supply end step). The mixture delivery process is performed for a first predetermined time, the first fluid delivery process is performed for a second predetermined time, and the delivery process is performed for a third predetermined time. The first predetermined time is set to a time necessary for applying the release agent to the cavity 3a. The second predetermined time is set to a time necessary for the release agent applied to the cavity 3a to dry while the air is applied to the cavity 3a. The third predetermined time is set to a time necessary for discharging the release agent remaining in the second fluid supply path 13 after the delivery port 11 is housed in the through hole 5 and blocked.

According to the mold 1 and the delivery method of the present embodiment, the first fluid supply path 12 is connected to the downstream side end part in the flow direction (the end part on the tip side) of the mixing chamber 14, the second fluid supply path 13 is connected to the upstream side end part in the flow direction (the end part on the base end side) of the mixing chamber 14, and the delivery port 11 is provided on the outer cylinder 7 serving as a side wall of the mixing chamber 14 connected to the upstream side end part in the flow direction and the downstream side end part in the flow direction. For this reason, when the mixture delivery state in which the mixture is delivered from the delivery port 11 is switched to the first fluid delivery state in which the air as the first fluid is delivered from the delivery port 11, the back pressure of the second fluid supply path 13 can be increased by supplied the air as the first fluid from the first fluid supply path 12 to the mixing chamber 14. Then, it is possible to suppress or prevent the release agent as the second fluid that remains in the second fluid supply path 13 from being delivered from the delivery port 11. As a result, switching from the mixture delivery state to the first fluid delivery state can be performed smoothly.

Note that in the present embodiment, it has been described that the mold 1 functions as a delivery device, and the method of blocking the delivery port 11 uses the through hole 5 of the movable mold 3. However, a blocking mechanism of the delivery port 11 is not limited to this, and other blocking mechanisms may be used.

REFERENCE SIGNS LIST

1 Mold
2 Fixed mold
3 Movable mold
3a Cavity
4 Delivery nozzle
5 Through hole (Housing part)

6 Pressing mechanism
7 Outer cylinder
8 Inner cylinder
9 Bolt
10 Communication part
11 Delivery port
12 First fluid supply path
13 Second fluid supply path
14 Mixing chamber
20 Delivery device
21 Discharge path
31 First opening and closing valve
32 Second opening and closing valve
33 Discharge valve
40 Control part
50 Branch part

The invention claimed is:

1. A mold having a delivery device,
wherein the delivery device comprises:
a first fluid supply path that supplies a first fluid, the first fluid being air;
a second fluid supply path that supplies a second fluid to be mixed with the first fluid for obtaining a mixture, the second fluid being a liquid;
a mixing chamber to which the first fluid supply path and the second fluid supply path are connected, and in which the first fluid and the second fluid are mixed with each other;
a delivery port capable of delivering the mixture from the mixing chamber;
a discharge path provided by being branched from the second fluid supply path; and
a discharge valve interposed in the discharge path so as to be freely opened and closed,
wherein the first fluid supply path is connected to a downstream side end part in a flow direction of the mixing chamber, the second fluid supply path is connected to an upstream side end part in the flow direction of the mixing chamber, the first fluid and the second fluid are mixed in the mixing chamber such that the flow directions of the first fluid and the second fluid are opposed to each other, and the delivery port is provided on a side wall of the mixing chamber between the downstream side end part in the flow direction and the upstream side end part in the flow direction,
wherein the mold comprises:
a delivery nozzle having the mixing chamber, a housing part capable of housing the delivery nozzle, a pressing mechanism that presses the delivery nozzle such that the delivery nozzle can be freely protruded from the housing part into a cavity of the mold; and a control part that controls opening and closing of the discharge valve and controls the pressing mechanism,
wherein the first fluid supply path is provided with a first opening and closing valve interposed so as to be freely opened and closed, the second fluid supply path is provided with a second opening and closing valve interposed so as to be freely opened and closed, and the control part also controls the first opening and closing valve and the second opening and closing valve,
wherein the control part performs:
a mixture delivery process of delivering the mixture from the delivery port by opening the first opening and closing valve, opening the second opening and closing valve, and closing the discharge valve in a protruding state in which the delivery nozzle is protruded into the cavity of the mold by the pressing mechanism;
a first fluid delivery process of delivering the first fluid from the delivery port by opening the first opening and closing valve, closing the second opening and closing valve, and opening the discharge valve in the protruding state; and
a discharge process of discharging the second fluid remaining in the second fluid supply path from the discharge path by maintaining an opening state of the first opening and closing valve, a closing state of the second opening and closing valve, and an opening state of the discharge valve for a predetermined time after the first fluid delivery process has ended in a housing state in which the delivery nozzle is housed in the housing part of the mold by the pressing mechanism.

2. The mold having the delivery device according to claim 1, the mold further comprising:
a plurality of the delivery nozzle, each of the plurality of the delivery nozzle having the mixing chamber and the delivery port; and
a branch part interposed in the second fluid supply path that branches from the second fluid supply path into a plurality of second fluid supply paths from an upstream side to a downstream side to be respectively connected to the plurality of delivery nozzles,
wherein the branch part is configured such that a first branch connection part to which the second fluid supply path branching into the plurality of second fluid supply paths on the downstream side is connected is located above a second branch connection part of the second fluid supply path located on the upstream side.

3. The mold according to claim 2, wherein the discharge path that discharges the second fluid therein is connected via the discharge valve to the second fluid supply path located on the upstream side of the branch part.

4. The mold according to claim 1, wherein the liquid of the second fluid is a release agent.

5. A method of controlling the mold according to claim 1, comprising performing with the control part:
a second fluid delivery step of delivering the second fluid from the delivery port of the delivery nozzle by protruding the delivery nozzle into the cavity of the mold by the pressing mechanism, closing the discharge valve, and opening the first opening and closing valve and the second opening and closing valve;
a first fluid delivery step of supplying only the first fluid from the first fluid supply path to the delivery nozzle by closing the second opening and closing valve and opening the discharge valve after an end of the second fluid delivery step;
a delivery nozzle housing step of starting a housing operation on the delivery nozzle by the pressing mechanism after the first fluid delivery step;
a second fluid discharge step of maintaining the opening state of the first opening and closing valve for the predetermined time in the housing state in which the delivery nozzle is housed in the housing part of the mold; and
a delivery end step of closing the first opening and closing valve and the discharge valve after the predetermined time has elapsed.

6. A method of controlling the mold according to claim 2, comprising performing with the control part:

a second fluid delivery step of delivering the second fluid from the delivery port of the delivery nozzle by protruding the delivery nozzle into the cavity of the mold by the pressing mechanism, closing the discharge valve, and opening the first opening and closing valve and the second opening and closing valve;

a first fluid delivery step of supplying only the first fluid from the first fluid supply path to the delivery nozzle by closing the second opening and closing valve and opening the discharge valve after an end of the second fluid delivery step;

a delivery nozzle housing step of starting a housing operation on the delivery nozzle by the pressing mechanism after the first fluid delivery step;

a second fluid discharge step of maintaining the opening state of the first opening and closing valve for the predetermined time in the housing state in which the delivery nozzle is housed in the housing part of the mold; and a delivery end step of closing the first opening and closing valve and the discharge valve after the predetermined time has elapsed.

\* \* \* \* \*